United States Patent
Okuda et al.

(10) Patent No.: US 11,735,743 B2
(45) Date of Patent: Aug. 22, 2023

(54) POWER STORAGE DEVICE AND POWER STORAGE DEVICE PRODUCTION METHOD

(71) Applicant: KABUSHIKI KAISHA TOYOTA JIDOSHOKKI, Kariya (JP)

(72) Inventors: Shinya Okuda, Kariya (JP); Satoshi Endo, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 548 days.

(21) Appl. No.: 16/325,488

(22) PCT Filed: Sep. 21, 2017

(86) PCT No.: PCT/JP2017/034103
§ 371 (c)(1),
(2) Date: Feb. 14, 2019

(87) PCT Pub. No.: WO2018/074135
PCT Pub. Date: Apr. 26, 2018

(65) Prior Publication Data
US 2019/0260034 A1   Aug. 22, 2019

(30) Foreign Application Priority Data
Oct. 17, 2016   (JP) .................................. 2016-203570

(51) Int. Cl.
*H01M 4/70*   (2006.01)
*H01M 4/64*   (2006.01)
(Continued)

(52) U.S. Cl.
CPC .............. *H01M 4/70* (2013.01); *H01G 11/10* (2013.01); *H01G 11/12* (2013.01); *H01G 11/76* (2013.01);
(Continued)

(58) Field of Classification Search
CPC ........... H01M 2004/029; H01M 10/04; H01M 10/0525; H01M 10/0585; H01G 11/82; H01G 11/86; H01G 11/80; H01G 11/12
See application file for complete search history.

(56) References Cited

U.S. PATENT DOCUMENTS 5,428,501 A * 6/1995 Bruder ...................... H01G 9/08
                                                                  361/535
5,527,642 A * 6/1996 Meadows ............. H01M 50/10
                                                                  429/210
(Continued)

FOREIGN PATENT DOCUMENTS

CN            101076915 A      11/2007
JP                7-57768 A       3/1995
(Continued)

OTHER PUBLICATIONS

JP-2005135764-A translation (Year: 2005).*
(Continued)

*Primary Examiner* — Ula C Ruddock
*Assistant Examiner* — Amanda Rosenbaum
(74) *Attorney, Agent, or Firm* — Sughrue Mion, PLLC

(57) ABSTRACT

A power storage device includes: a plurality of bipolar electrodes being stacked, each of the plurality of bipolar electrodes including a collector having a first surface and a second surface opposite to the first surface, a positive electrode layer provided on the first surface, and a negative electrode layer provided on the second surface; a first resin member provided on at least one surface of the first surface and the second surface in at least a portion of an outer peripheral portion of the collector; and a second resin member provided on the first resin member and supporting the outer peripheral portion of the collector via the first resin member. The respective first resin members for the bipolar
(Continued)

electrodes adjacent to each other in a stacking direction of the plurality of bipolar electrodes are connected to each other by a welded portion.

6 Claims, 9 Drawing Sheets

(51) Int. Cl.

| | | |
|---|---|---|
| *H01M 10/04* | (2006.01) | |
| *H01M 10/0585* | (2010.01) | |
| *H01M 10/02* | (2006.01) | |
| *H01G 11/80* | (2013.01) | |
| *H01M 50/103* | (2021.01) | |
| *H01M 50/593* | (2021.01) | |
| *H01G 11/12* | (2013.01) | |
| *H01G 11/76* | (2013.01) | |
| *H01G 11/86* | (2013.01) | |
| *H01M 10/0525* | (2010.01) | |
| *H01M 10/30* | (2006.01) | |
| *H01G 11/10* | (2013.01) | |
| *H01G 11/84* | (2013.01) | |
| *H01M 50/586* | (2021.01) | |
| *H01M 4/02* | (2006.01) | |

(52) U.S. Cl.
CPC ............. *H01G 11/80* (2013.01); *H01G 11/84* (2013.01); *H01G 11/86* (2013.01); *H01M 4/64* (2013.01); *H01M 10/04* (2013.01); *H01M 10/0525* (2013.01); *H01M 10/0585* (2013.01); *H01M 10/30* (2013.01); *H01M 50/103* (2021.01); *H01M 50/586* (2021.01); *H01M 50/593* (2021.01); *H01M 2004/029* (2013.01)

(56) References Cited

U.S. PATENT DOCUMENTS

| | | | |
|---|---|---|---|
| 5,562,741 A | 10/1996 | Meadows et al. | |
| 5,859,761 A * | 1/1999 | Aoki | H01G 11/12 29/25.03 |
| 2009/0053601 A1* | 2/2009 | Kelley | H01M 4/808 156/308.2 |
| 2009/0233164 A1 | 9/2009 | Shimamura et al. | |
| 2010/0015517 A1* | 1/2010 | Fujita | H01M 4/663 429/163 |
| 2012/0005882 A1* | 1/2012 | Shimamura | H01M 10/0418 29/623.4 |
| 2016/0197373 A1* | 7/2016 | Shaffer, II | H01M 50/60 429/210 |

FOREIGN PATENT DOCUMENTS

| | | | | |
|---|---|---|---|---|
| JP | 2001085274 A | * | 3/2001 | ............ H01G 9/016 |
| JP | 2001-155973 A | | 6/2001 | |
| JP | 2005-135764 A | | 5/2005 | |
| JP | 2005135764 A | * | 5/2005 | |

OTHER PUBLICATIONS

JP2001085274A translation (Year: 2001).*
International Preliminary Report on Patentability issued from the International Bureau in counterpart International Application No. PCT/JP2017/034103, dated May 2, 2019.
International Search Report in International Application No. PCT/JP2017/034103, dated Oct. 31, 2017.

* cited by examiner

POWER STORAGE DEVICE AND POWER STORAGE DEVICE PRODUCTION METHOD

TECHNICAL FIELD

One aspect of the present invention relates to a power storage device and a method for producing the power storage device.

BACKGROUND ART

There is known a bipolar battery including bipolar electrodes in which a positive electrode is formed on one side of a collector and a negative electrode is formed on the other side of the collector. In a bipolar battery, a plurality of bipolar electrodes are stacked in series with electrolyte layers being interposed.

For example, in a bipolar battery disclosed in Patent Literature 1, a polypropylene layer covers the periphery of a bipolar plate (collector) formed by a metal such as nickel. The polypropylene layer and a polypropylene cell casing for supporting the plurality of collectors are fixed by integral molding. When integrally molding the polypropylene layer and the cell casing, a bipolar plate covered with a polypropylene layer is placed in a mold, and polypropylene is flowed into the mold to perform injection molding (insert molding method).

CITATION LIST

Patent Literature

Patent Literature 1: Japanese Unexamined Patent Publication No. 2005-135764

SUMMARY OF INVENTION

Technical Problem

When the plurality of bipolar plates are stacked and placed in the mold and the injection molding is performed, in some cases, position misalignment may occur between the plurality of adjacent bipolar plates due to a pressure of polypropylene flowing into the mold.

An aspect of the present invention is to provide a power storage device in which position misalignment between adjacent bipolar electrodes is suppressed and a method for producing the power storage device.

Solution to Problem

According to an aspect of the invention, there is provided a power storage device including: a plurality of bipolar electrodes being stacked, each of the plurality of bipolar electrodes including a collector having a first surface and a second surface opposite to the first surface, a positive electrode layer provided on the first surface, and a negative electrode layer provided on the second surface; a first resin member provided on at least one surface of the first surface and the second surface in at least a portion of an outer peripheral portion of the collector, and a second resin member provided on the first resin member and supporting the outer peripheral portion of the collector via the first resin member, in which the respective first resin members for the bipolar electrodes adjacent to each other in a stacking direction of the plurality of bipolar electrodes are connected to each other by a welded portion.

In the above power storage device, the respective first resin members for the bipolar electrodes adjacent to each other in a stacking direction of the plurality of bipolar electrodes are connected to each other by a welded portion. Therefore, even in a case where a pressure is applied to the bipolar electrode when the second resin member is formed, it is possible to suppress position misalignment between the adjacent bipolar electrodes.

The second resin member may cover an outer side of the first resin member.

The welded portion may be provided on an outer end surface of the first resin member and extend from the bipolar electrode at one end to the bipolar electrode at the other end in the stacking direction of the plurality of bipolar electrodes.

The welded portion may have a tubular shape and may be arranged so as to surround an entire circumference of the outer peripheral portion of the collector.

The welded portion may be arranged on each side of the collector having a rectangular shape as viewed from the stacking direction of the plurality of bipolar electrodes.

In this case, as compared with a case where the welded portion is arranged at each apex of the collector, the effect of suppressing the position misalignment between the adjacent bipolar electrodes becomes large.

According to an aspect of the present invention, there is provided a method for producing a power storage device including a plurality of bipolar electrodes being stacked, each of the plurality of bipolar electrodes including a collector having a first surface and a second surface opposite to the first surface, a positive electrode layer provided on the first surface, and a negative electrode layer provided on the second surface, the method including steps of: providing a first resin member on at least one surface of the first surface and the second surface in at least a portion of an outer peripheral portion of the collector of each of the plurality of bipolar electrodes; stacking the plurality of bipolar electrodes; welding the respective first resin members for the bipolar electrodes adjacent to each other in a stacking direction of the plurality of bipolar electrodes; and forming a second resin member by injection molding, the second resin member covering outer sides of the first resin members welded to each other and supporting the outer peripheral portion of the collector via the first resin members.

Advantageous Effects of Invention

According to one aspect of the present invention, it is possible to provide a power storage device in which position misalignment between adjacent bipolar electrodes is suppressed and a method for producing the power storage device.

DESCRIPTION OF EMBODIMENTS

Figure 1:
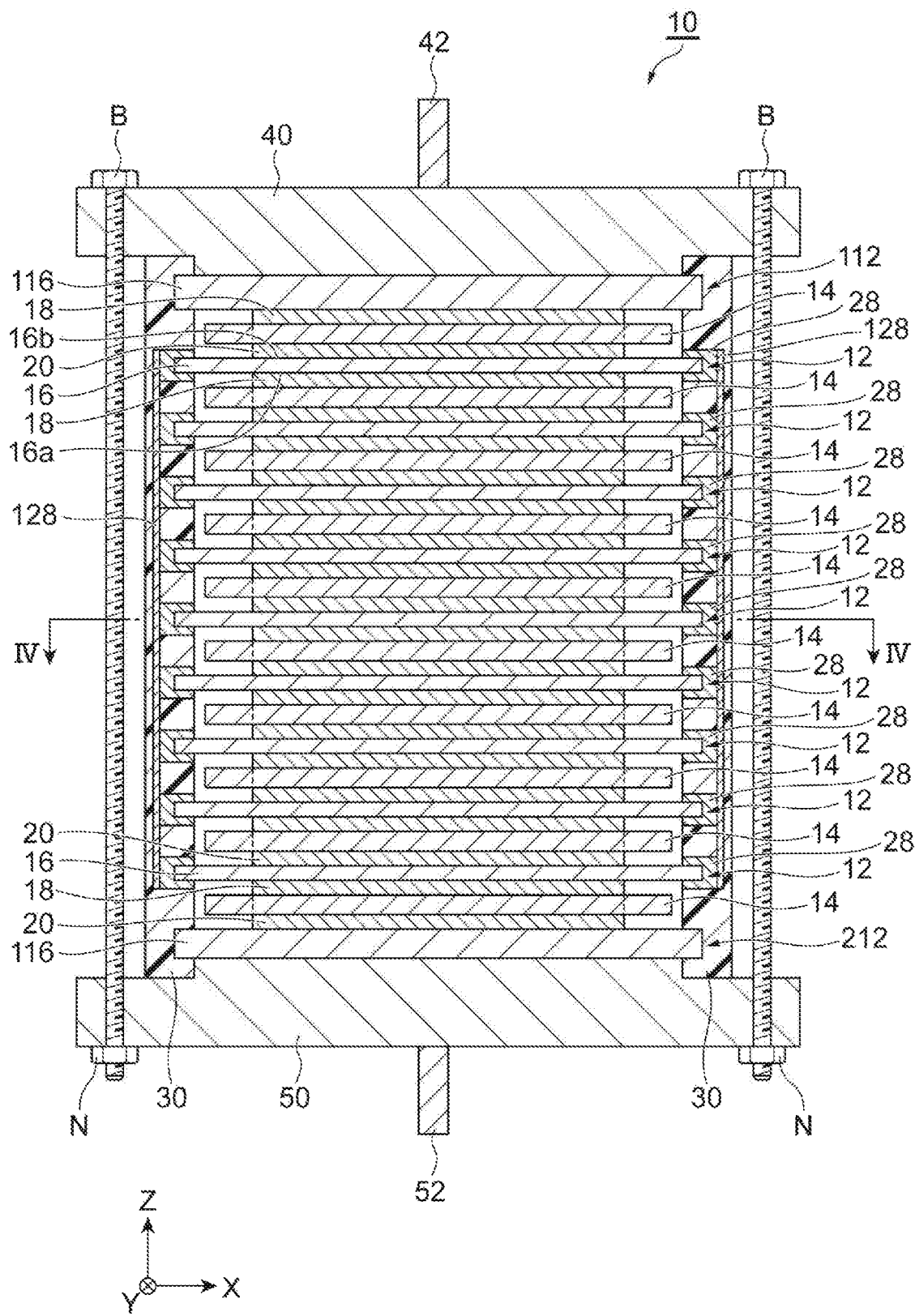
FIG. 1 is a cross-sectional view schematically illustrating a power storage device according to an embodiment.

Hereinafter, embodiments of the present invention will be described in detail with reference to the accompanying drawings. In the description of the drawings, the same reference numerals are used for the same or equivalent elements, and redundant description thereof will be omitted. An XYZ perpendicular coordinate system is illustrated in the drawings as necessary.

Figure 2:
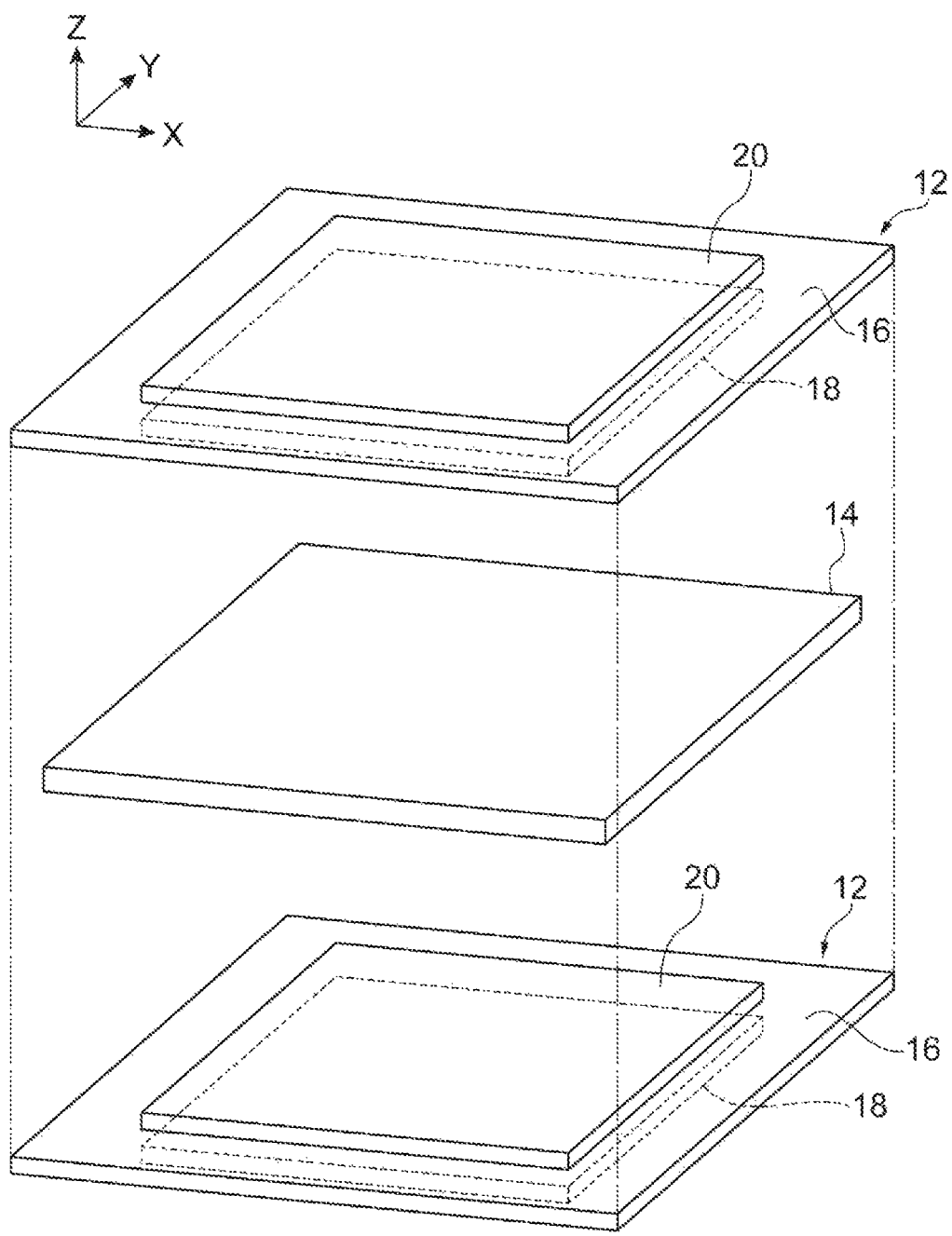
FIG. 2 is an exploded perspective view schematically illustrating a portion of the power storage device according to the embodiment.

FIG. 1 is a cross-sectional view schematically illustrating a power storage device according to an embodiment. FIG. 2 is an exploded perspective view schematically illustrating a portion of the power storage device according to the embodiment. A power storage device 10 illustrated in FIG. 1, for example, may be a secondary battery such as a nickel hydrogen secondary battery or a lithium ion secondary battery, or may be an electric double layer capacitor. The power storage device 10 may be mounted on a vehicle such as a forklift, a hybrid vehicle, and an electric vehicle.

The power storage device 10 includes a plurality of bipolar electrodes 12. The plurality of bipolar electrodes 12 are stacked in series via separators 14. Each of the plurality of bipolar electrodes 12 includes a collector 16 having a first surface 16a and a second surface 16b opposite to the first surface 16a, a positive electrode layer 18 provided on the first surface 16a, and a negative electrode layer 20 provided on the second surface 16b. The positive electrode layer 18 and the negative electrode layer 20 extend along a plane (for example, an XY plane) that intersects a stacking direction (hereinafter, also referred to as a Z axis direction) of the plurality of bipolar electrodes 12.

The separator 14 may be in a sheet shape or a bag shape. The separator 14 is, for example, a porous membrane or a nonwoven fabric. The separator 14 can permeate an electrolytic solution. As a material of the separator 14, polyolefin such as polyethylene or polypropylene, a polyamide type material such as polyimide or aramid fiber may be exemplified. The separator 14 reinforced with a vinylidene fluoride resin compound may be used. As the electrolytic solution, for example, an alkaline solution such as an aqueous potassium hydroxide solution may be used.

The collector 16 may be, for example, a metal foil such as a nickel foil or may be, for example, a conductive resin member such as a conductive resin film. The thickness of the collector 16 is, for example, 0.1 to 1000 μm. The positive electrode layer 18 contains a positive electrode active material. In a case where the power storage device 10 is a nickel hydrogen secondary battery, the positive electrode active material is, for example, nickel hydroxide ($Ni(OH)_2$) particles. In a case where the power storage device 10 is a lithium ion secondary battery, the positive electrode active material is, for example, a complex oxide, metallic lithium, sulfur, or the like. The negative electrode layer 20 contains a negative electrode active material. In a case where the power storage device 10 is a nickel hydrogen secondary battery, the negative electrode active material is, for example, particles of a hydrogen storage alloy. In a case where the power storage device 10 is a lithium ion secondary battery, the negative electrode active material may be a carbon such as graphite, highly oriented graphite, mesocarbon microbeads, hard carbon, or soft carbon, an alkali metal such as lithium or sodium, a metal compound, a metal oxide such as $SiO_X$ ($0.5 \leq x \leq 1.5$), a boron-doped carbon, and the like.

In the Z axis direction, the plurality of bipolar electrodes 12 and the plurality of separators 14 may be interposed between an electrode 112 and an electrode 212. The electrode 112 and the electrode 212 are electrodes located on the outermost side in the Z axis direction. The electrode 112 includes a collector 116 and the positive electrode layer 18 provided on a surface of the separator 14 facing the collector 116. The electrode 212 includes a collector 116 and a negative electrode layer 20 provided on a surface of the separator 14 facing the collector 116. The collector 116 has the same configuration as the collector 16 except that the collector 116 is thicker than the collector 16 in the Z axis direction.

The power storage device 10 includes a resin member 28 (a first resin member) and an insulating case 30 (a second resin member). The resin member 28 is provided on the outer peripheral portion 161 (refer to FIG. 3 described later) of the collector 16. The resin members 28 adjacent to each other in the Z axis direction are connected by a welded portion 128. The insulating case 30 is a resin case supporting the plurality of bipolar electrodes 12 via the resin member 28. The material of the insulating case 30 may be the same as or different from the material of the resin member 28. The insulating case 30 is a case made of, for example, polyparaphenylene benzobisoxazole (Zylon (registered trademark)). The insulating case 30 may support the electrode 112 and the electrode 212. The insulating case 30 may be a tubular member capable of accommodating the plurality of bipolar electrodes 12 and the plurality of separators 14. An electrolytic solution is contained in the insulating case 30. Details of the resin member 28, the insulating case 30, and the welded portion 128 will be described later with reference to FIGS. 3 to 5.

The power storage device 10 may include a positive electrode plate 40 and a negative electrode plate 50. The positive electrode plate 40 and the negative electrode plate 50 interpose the plurality of bipolar electrodes 12 and the plurality of separators 14 in the Z axis direction. The positive electrode plate 40 and the negative electrode plate 50 may interpose the electrode 112, the electrode 212, and the insulating case 30. The electrode 112 is arranged between the positive electrode plate 40 and the separator 14. The electrode 212 is arranged between the negative electrode plate 50 and the separator 14. A positive electrode terminal 42 is connected to the positive electrode plate 40. A negative electrode terminal 52 is connected to the negative electrode plate 50. It is possible to perform charging and discharging of the power storage device 10 by the positive electrode terminal 42 and the negative electrode terminal 52.

The positive electrode plate 40 and the negative electrode plate 50 are provided with through holes for penetrating bolts B extending in the Z axis direction. The through hole is arranged on the outer side of the insulating case 30 as viewed from the Z axis direction. The bolt B can be passed from the positive electrode plate 40 toward the negative electrode plate 50 with the bolt insulated from the positive electrode plate 40 and the negative electrode plate 50. A nut N is threadedly engaged with the distal end of the bolt B. Therefore, the positive electrode plate 40 and the negative electrode plate 50 can bind the plurality of bipolar electrodes 12, the plurality of separators 14, the electrode 112, the electrode 212, and the insulating case 30. As a result, the insulating case 30 can be hermetically sealed.

Figure 3:
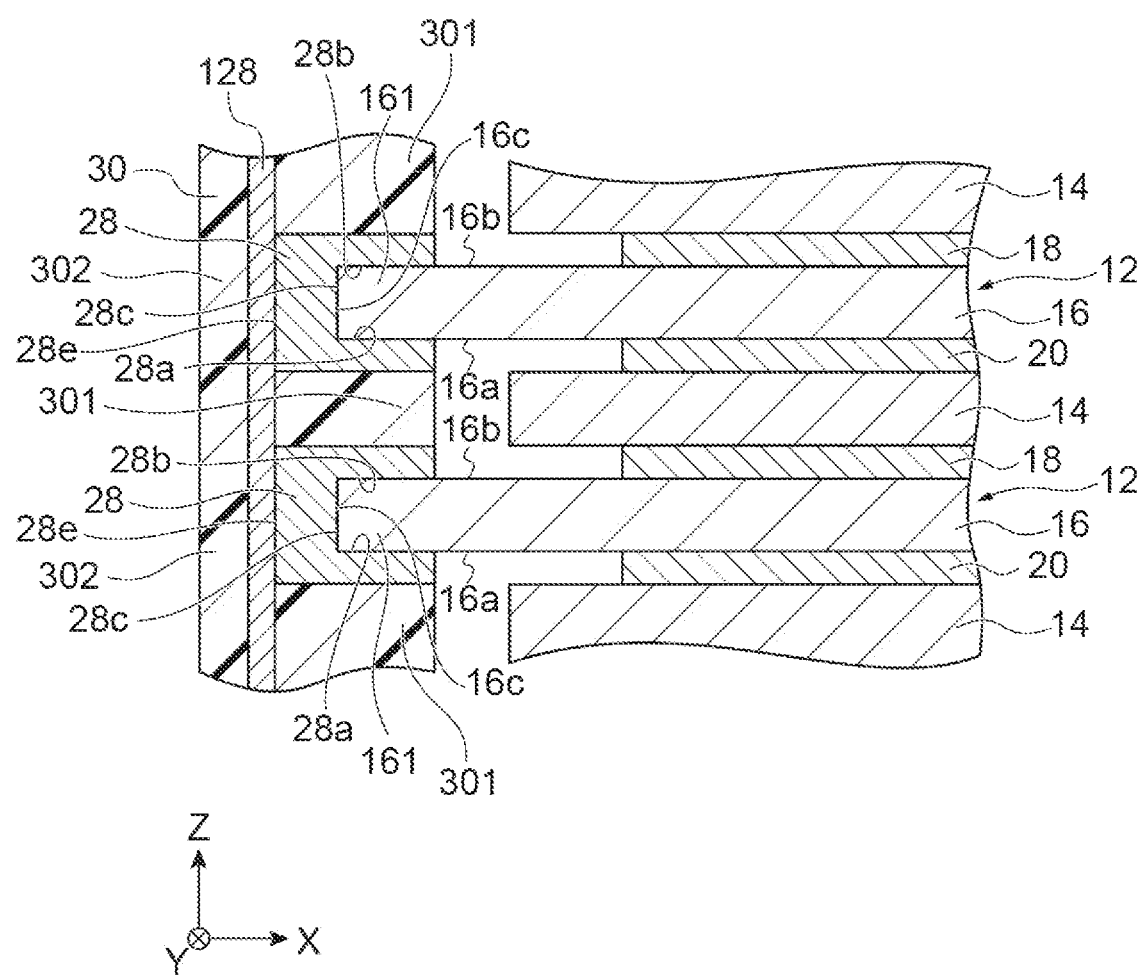
FIG. 3 is an enlarged cross-sectional view of a first resin member, a second resin member, and a welded portion.

FIG. 3 is an enlarged cross-sectional view of the resin member 28, the insulating case 30, and the welded portion 128. The resin member 28 is provided on at least a portion of the outer peripheral portion 161 of the collector 16. The resin member 28 may be provided in an annular shape over the entire outer peripheral portion 161. The resin member 28 is provided on at least one surface of the first surface 16a and the second surface 16b of the collector 16. In the example illustrated in FIG. 3, the resin member 28 is provided on both surfaces of the first surface 16a and the second surface 16b of the collector 16. The resin member 28 has a contact surface 28a that is in contact with the first surface 16a of a collector 16 and a contact surface 28b that is in contact with the second surface 16b of a collector 16. The resin member 28 may also be provided on an end surface 16c of the collector 16. In this case, the resin member 28 also has a contact surface 28c that is in contact with the end surface 16c of the collector 16. The end surface 16c is a surface connecting the first surface 16a and the second surface 16b. The contact surface 28c is a surface connecting the contact surface 28a and the contact surface 28b. The resin member 28 has a U-shaped cross section as viewed from a direction perpendicular to the outer peripheral direction (the Y axis direction in the portion illustrated in FIG. 3) of the collector 16 so as to cover the outer peripheral portion 161 of the collector 16.

As the material of the resin member 28, polystyrene (PS), polyamide (PA) 66, polycarbonate (PC), polyphenylene sulfide (PPS), polybutylene terephthalate (PBT resin), and the like may be exemplified. By using these materials, it is possible to allow the resin member 28 to have insulating properties.

The insulating case 30 is provided on the resin member 28. The insulating case 30 supports the outer peripheral portion 161 of the collector 16 via the resin member 28. In the example illustrated in FIG. 3, the resin member 28 is buried in the insulating case 30 together with the outer peripheral portion 161 of the collector 16. The insulating case 30 has a first portion 301 located between the resin members 28 adjacent to each other in the Z axis direction and a second portion 302 covering the outer side of the resin member 28. The first portion 301 and the second portion 302 are alternately arranged in the Z axis direction.

The welded portion 128 fixes the respective resin members 28 for the bipolar electrodes 12 adjacent to each other in the Z axis direction. The welded portion 128 is provided on an end surface 28e located outside the resin member 28 as viewed from the Z axis direction. The welded portion 128 extends from the bipolar electrode 12 at one end to the bipolar electrode 12 at the other end in the Z axis direction. The welded portion 128 may be formed by irradiating the end surface 28e of the resin member 28 with, for example, ultrasonic waves, laser, or the like and may be formed by heating the end surface 28e of the resin member 28 by using a hot plate or the like. The material of the welded portion 128 is the same as the material of the resin member 28.

Figure 4:
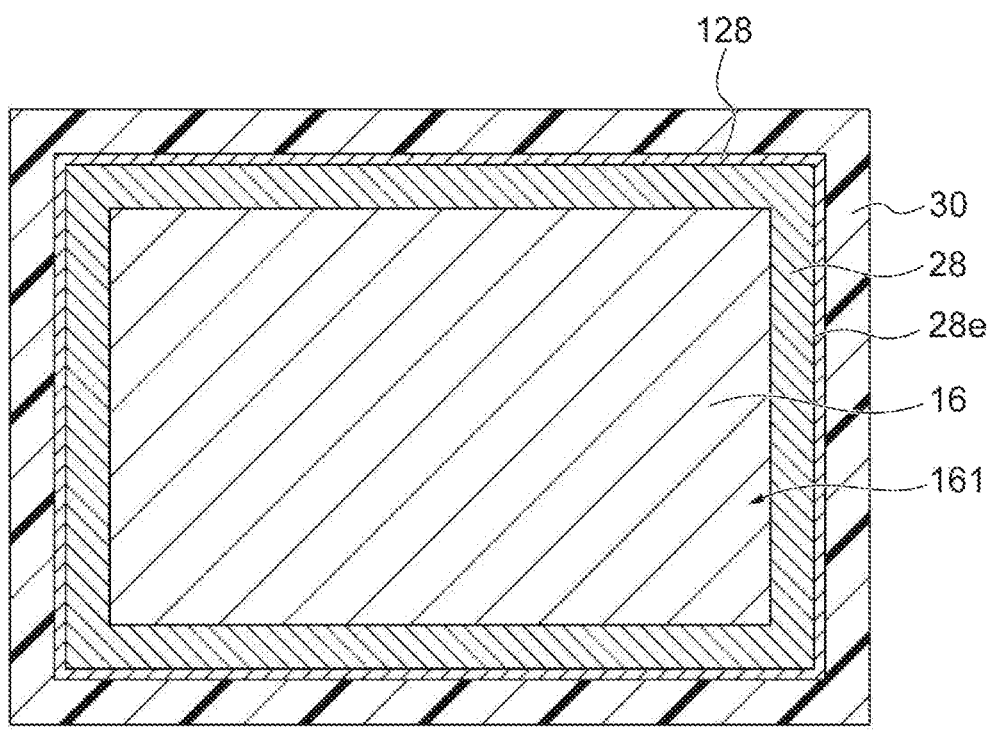
FIG. 4 is a cross-sectional view of the power storage device taken along line IV-IV of FIG. 1.
Figure 5:
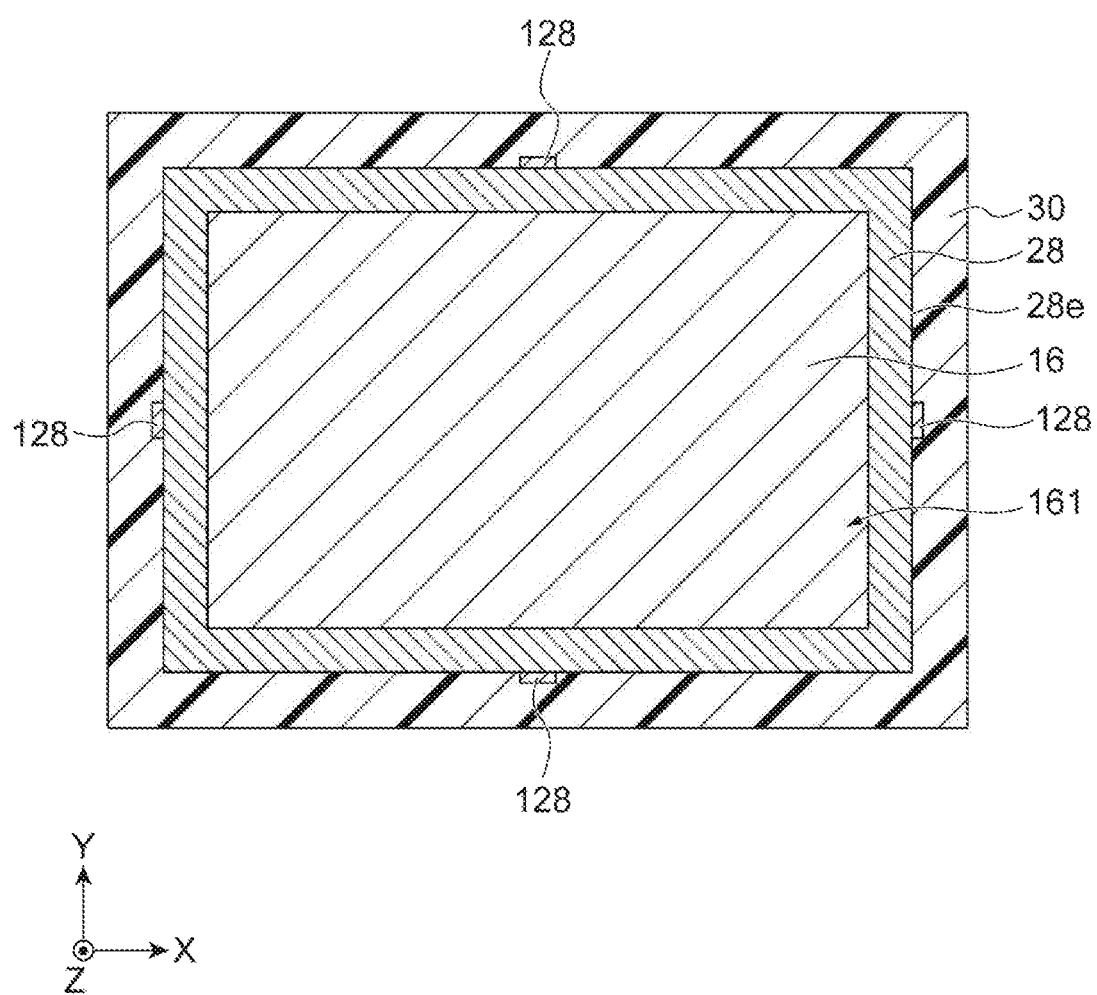
FIG. 5 is a cross-sectional view of a power storage device having a welded portion according to Modified Example.

FIG. 4 is a cross-sectional view of the power storage device taken along line IV-IV of FIG. 1. In the example illustrated in FIG. 4, the welded portion 128 is arranged so as to surround the entire circumference of the outer peripheral portion 161 of the collector 16 as viewed from the Z axis direction. In this case, the welded portion 128 has a tubular shape. Alternatively, as illustrated in FIG. 5, the welded portion 128 may be arranged on each side of the collector 16 having, for example, a rectangular shape as viewed from the Z axis direction. In this case, the plurality of welded portions 128 are arranged to be separated from each other. Each welded portion 128 has a rod shape. The welded portion 128 is arranged, for example, at the center of each side of the collector 16. The welded portion 128 may be arranged, for example, at each vertex of the collector 16 having a rectangular shape.

In the power storage device 10 described above, the respective resin members 28 for the bipolar electrodes 12 adjacent to each other in the Z axis direction are connected to each other by the welded portions 128. For this reason, for example, when the insulating case 30 is formed by injection molding (insertion molding), for example, even though a pressure in the lateral direction (direction within the XY plane) is applied to the bipolar electrode 12 by a fluid of the material of the insulating case 30, it is possible to suppress position misalignment between the adjacent bipolar electrodes 12. If the number of layers of the bipolar electrodes 12 increases or the thickness of the bipolar electrode 12 decreases, in general, the position misalignment between the adjacent bipolar electrodes tends to become large. However, even in such a case, in the power storage device 10, it is possible to suppress the position misalignment between the adjacent bipolar electrodes 12. By suppressing the position misalignment between the adjacent bipolar electrodes, a short circuit caused by contact between the adjacent bipolar electrodes, dimensional defect of the bipolar electrode, position misalignment of internal space in the insulating case 30, and the like are suppressed.

As illustrated in FIG. 5, when the welded portion 128 is arranged on each side of the collector 16 having a rectangular shape as viewed from the Z axis direction, as compared with a case where the welded portion 128 is arranged at each vertex of the collector 16, the effect of suppressing the position misalignment between the adjacent bipolar electrodes 12 becomes large. This is because, in general, as compared with each apex of the collector 16, with respect to each side, the pressure applied to the bipolar electrode 12 becomes large, and the amount of position misalignment becomes large.

Figure 6:
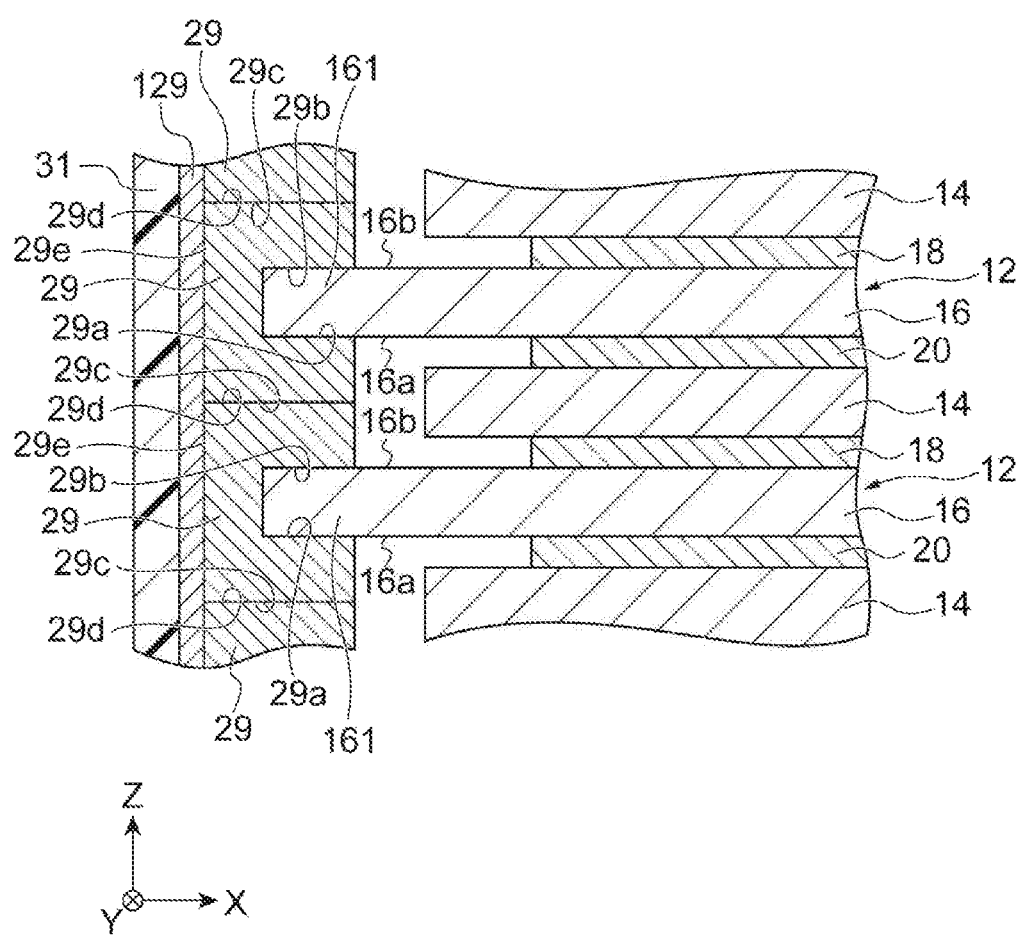
FIG. 6 is an enlarged cross-sectional view of a first resin member, a second resin member and a welded portion according to Modified Example.

In the example described above, the adjacent first resin members (resin members 28) are provided so as to be separated from each other via the insulating case 30. However, the first resin members may be provided so as to be in contact with each other. FIG. 6 is an enlarged cross-sectional view of a first resin member (resin member 29), a second resin member (insulating case 31) and a welded portion 129 according to such a modified example. In the example illustrated in FIG. 6, the respective resin members 29 for the bipolar electrodes 12 adjacent to each other in the Z axis direction are in contact with each other. Specifically, the resin member 29 has a contact surface 29c on the side opposite to a contact surface 29a that is in contact with the first surface 16a of the collector 16 and has a contact surface 29d on the side opposite to a contact surface 29b that is in contact with the second surface 16b of the collector 16. The contact surface 29c of the resin member 29 is in contact with the contact surface 29d of the resin member 29 on the lower side (in the negative direction of the Z axis). The contact surface 29d of the resin member 29 is in contact with the contact surface 29c of the resin member 29 on the upper side (in the positive direction of the Z axis). The separator 14 is located inside the resin member 29 as viewed from the Z axis direction. In the example illustrated in FIG. 6, in the Z axis direction, the contact surface 29c of the resin member 29 is located at the center of the separator 14 on the lower side of the collector 16 provided with the resin member 29. The contact surface 29d of the resin member 29 is located at the center of the separator 14 on the upper side of the collector 16 provided with the resin member 29. The insulating case 31 has a shape matching with the shape of the resin member 29 and is different from the insulating case 30 (FIG. 3) in that the insulating case 31 does not have a portion located between the resin members 29 adjacent to each other in the Z axis direction.

The thickness of the resin member 29 is larger than both of the thickness of the positive electrode layer 18 and the thickness of the negative electrode layer 20. In a case where the resin member 29 is provided on both surfaces of the first surface 16a and the second surface 16b of the collector 16, in the resin member 29, the thickness (the length in the Z axis direction) of the portion provided on the first surface 16a of the collector 16 is larger than the thickness of the negative electrode layer 20. In the resin member 29, the thickness of the portion provided on the second surface 16b of the collector 16 is larger than the thickness of the positive electrode layer 18.

As described above, the thickness of the resin member 29 may be larger than either the thickness of the positive electrode layer 18 or the thickness of the negative electrode layer 20. Therefore, it is possible to secure an interval between the positive electrode layer 18 and the negative electrode layer 20 provided on the collectors 16 of the bipolar electrodes 12 adjacent to each other in the stacking direction (Z axis direction) of the plurality of bipolar electrodes 12.

The respective resin members 29 for the bipolar electrodes 12 adjacent to each other in the Z axis direction may be in contact with each other. As a result, the interval between the collectors 16 can be determined by using the thickness of the resin member 29.

The welded portion 129 fixes the respective resin members 29 for the bipolar electrodes 12 adjacent to each other in the Z axis direction. The welded portion 129 is provided on an end surface 29e located on the outer side of the resin member 29 as viewed from the Z axis direction. The end surface 29e connects the contact surface 29c and the contact surface 29 d. The welded portion 129 extends from the bipolar electrode 12 at one end to the bipolar electrode 12 at the other end in the Z axis direction. The welded portion 129 can be formed by a method similar to the welded portion 128. The welded portion 129 may be arranged similarly to the welded portion 128 illustrated in FIG. 4 or FIG. 5. An example of the material of the welded portion 129 is the same as the example of the material of the welded portion 128.

Figure 7:
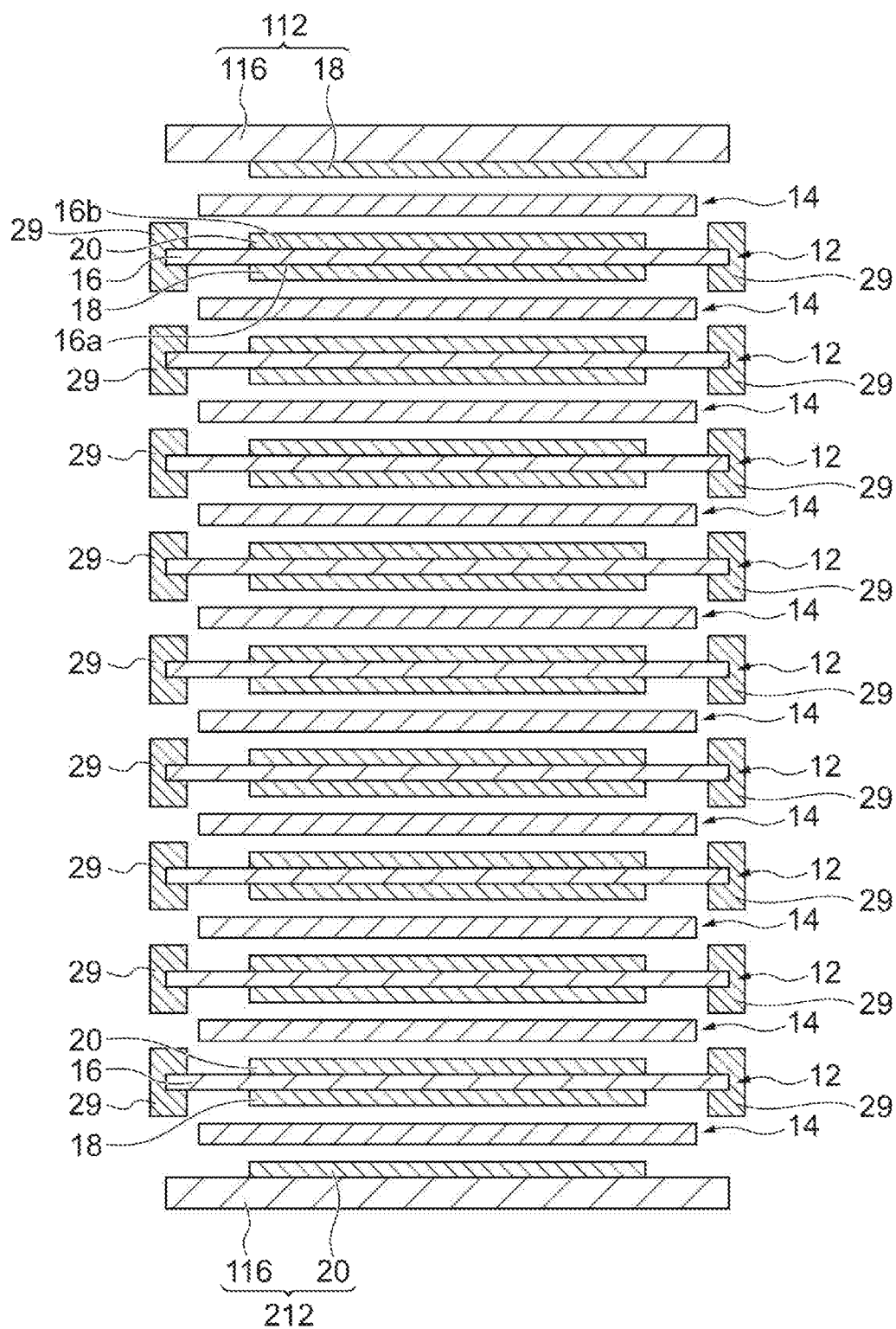
FIG. 7 is a cross-sectional view illustrating a step of a method for producing the power storage device according to an embodiment.
Figure 8:
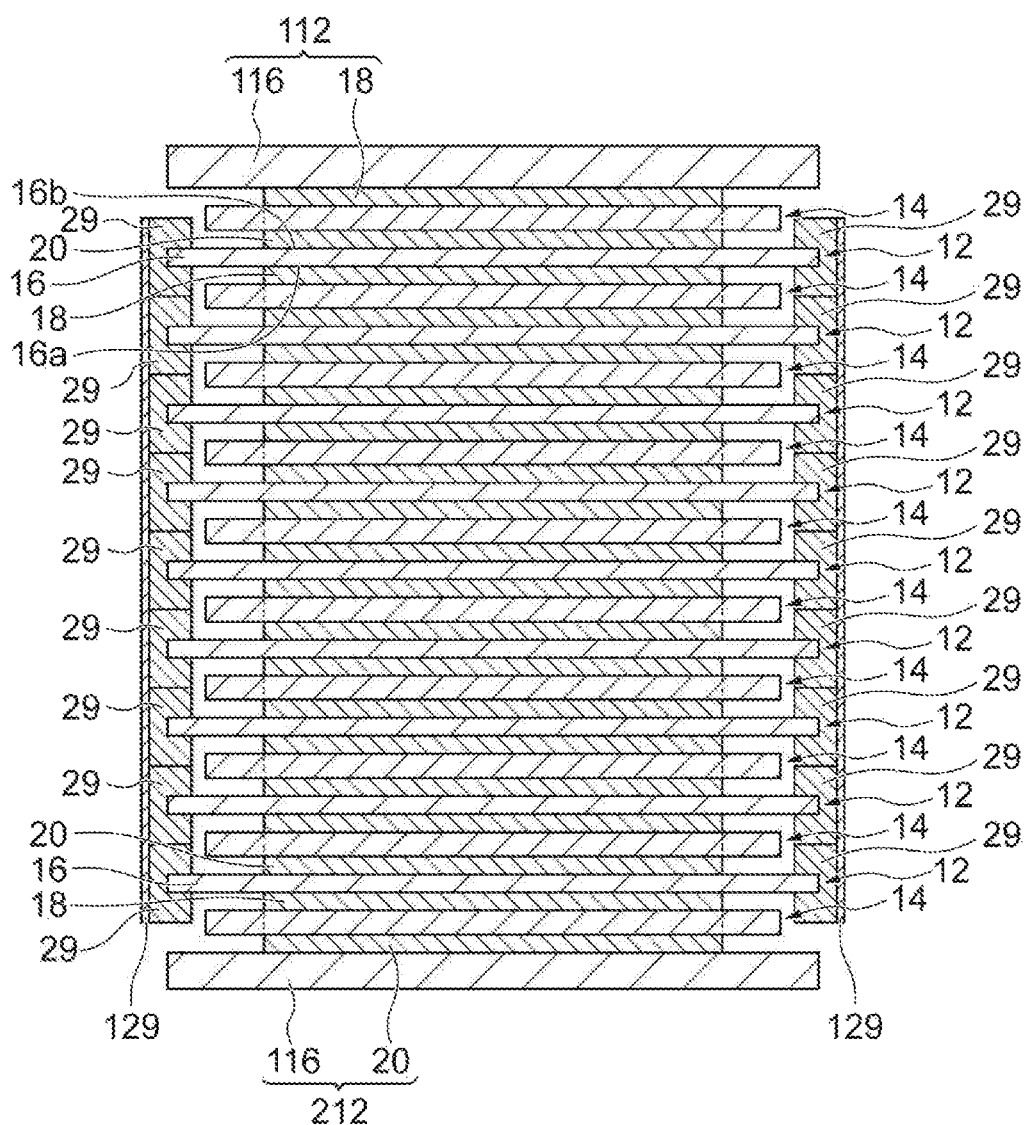
FIG. 8 is a cross-sectional view illustrating a step of the method for producing the power storage device according to the embodiment.
Figure 9:
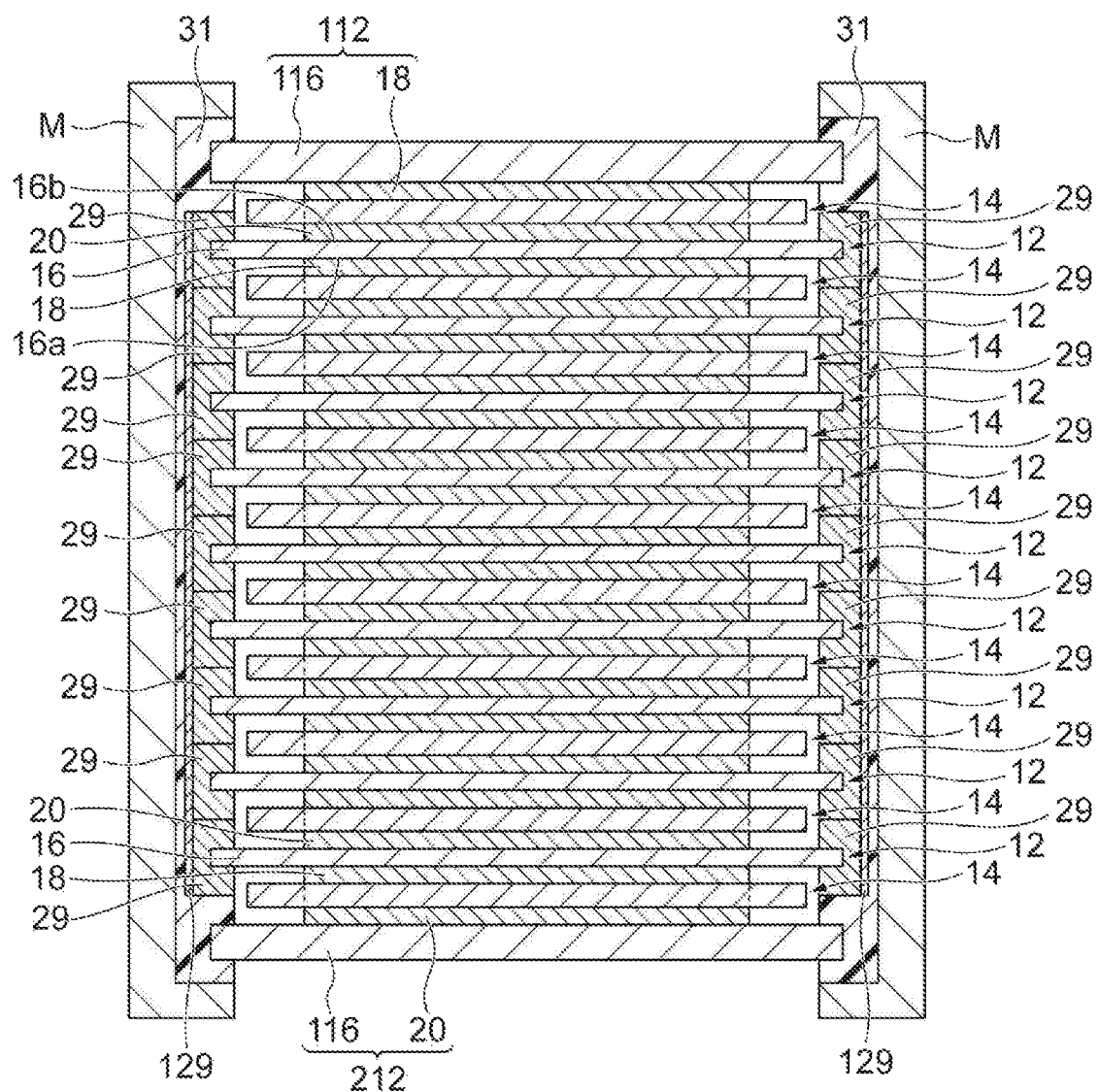
FIG. 9 is a cross-sectional view illustrating a step of the method for producing the power storage device according to the embodiment.

Next, an example of a method for producing the power storage device 10 will be described with reference to FIGS. 7 to 9. FIGS. 7 to 9 are cross-sectional views illustrating steps of the method for producing the power storage device according to the embodiment. Herein, a case where a first resin member, a second resin member, and a welded portion are the resin member 29, the insulating case 31 and the welded portion 129 illustrated in FIG. 6 described above will be described.

(Preparation Step)

First, as illustrated in FIG. 7, a plurality of bipolar electrodes 12 and a plurality of separators 14 are prepared. Each of the plurality of bipolar electrodes 12 includes a collector 16, a positive electrode layer 18, and a negative electrode layer 20.

(Step of Providing First Resin Member)

Next, as illustrated in FIG. 7, a resin member 29 is provided on an outer peripheral portion 161 (refer to FIG. 6) of the collector 16. The resin member 29 may be provided on both surfaces of a first surface 16a and a second surface 16b of the collector 16 over the entire outer peripheral portion 161. For example, the resin member 29 is formed by injection molding so that the resin member 29 covers the outer peripheral portion 161 of the collector 16. Therefore, the collector 16 and the resin member 29 are welded.

(Stacking Step)

Next, as illustrated in FIG. 8, the plurality of bipolar electrodes 12 are stacked in series via the separators 14. In this stacking step, the respective resin members 29 for the bipolar electrodes 12 adjacent to each other in the stacking direction of the plurality of bipolar electrodes 12 are in contact with each other. The separator 14 is provided so as to be located inside the resin member 29 as viewed from the stacking direction (Z axis direction) of the plurality of bipolar electrodes 12.

(Welding Step)

Next, as illustrated in FIG. 8, the respective resin members 29 for the bipolar electrodes 12 adjacent to each other in the stacking direction of the plurality of bipolar electrodes 12 are connected by the welded portion 129. That is, the adjacent resin members 29 are welded to each other. For example, the welded portion 129 is formed by heating the end surface 29e (refer to FIG. 6) of the resin member 29. Thus, the adjacent resin members 29 are fixed to each other. Alternatively, the welded portion 129 is formed by irradiating the end surface 29e of the resin member 29 with, for example, ultrasonic waves, laser, or the like.

(Step of Providing Second Resin Member)

Next, as illustrated in FIG. 9, the insulating case 31 is provided on the resin members 29 connected to each other by the welded portion 129. For example, the insulating case 31 is formed by injection molding using a mold M. First, the plurality of bipolar electrodes 12 connected to each other by the welded portions 129 are arranged in the mold M. After that, a fluid of the material of the insulating case 31 is supplied into the mold M, and the material is solidified. Therefore, the insulating case 31 is welded to the resin member 29 and the welded portion 129. The insulating case 31 supports the outer peripheral portion of the collector 16 via the resin members 29.

Next, as described above with reference to FIG. 1, the plurality of bipolar electrodes 12, the plurality of separators 14, the electrode 112, the electrode 212, and the insulating case 31 are interposed between the positive electrode plate 40 and the negative electrode plate 50. In addition, a binding force is applied to the positive electrode plate 40 and the negative electrode plate 50 by using the bolts B and the nuts N. Therefore, the power storage device 10 is produced.

Also in a case where the first resin member, the second resin member, and the welded portion are the resin member 28, the insulating case 30, and the welded portion 128 illustrated in FIG. 3, the power storage device 10 can be produced by the same method as the above-described production method.

According to the method for producing the power storage device described above, after the resin member 29 is provided on at least one of the first surface 16a and the second surface 16b in at least a portion of the outer peripheral portion 161 of the collector 16, the plurality of bipolar electrodes 12 are stacked. Therefore, when stacking the plurality of bipolar electrodes 12, it is possible to use the resin members 29 provided on the collectors 16 of the respective bipolar electrode 12 for relative positioning between the collectors.

In addition, the respective resin members 29 for the bipolar electrodes 12 adjacent to each other in the stacking direction of the plurality of bipolar electrodes 12 are connected by the welded portion 129. For this reason, for example, when the insulating case 31 is formed by injection molding, for example, even though a lateral pressure is applied to the bipolar electrode 12 by a fluid of the material of the insulating case 31, it is possible to suppress position misalignment between the adjacent bipolar electrodes 12.

In the step of preparing the resin member 29 (first resin member), the resin member 29 may be provided on both surfaces of the first surface 16a and the second surface 16b. In the stacking step, the plurality of bipolar electrodes 12 are stacked via the separators 14, and the respective resin members 29 for the bipolar electrodes 12 adjacent to each other in the stacking direction of the plurality of bipolar electrodes 12 are in contact with each other. The separators 14 may be located inside the resin member 29 as viewed from the stacking direction of the plurality of bipolar electrodes 12. In this case, since the respective resin members 29 of the adjacent bipolar electrodes 12 in the stacking direction are in contact with each other, the interval between the collectors 16 can be determined by using the thickness of the resin member 29. In addition, since the separator 14 is located inside the resin member 29 as viewed from the stacking direction, positioning of the separator 14 can be also performed by using the resin member 29.

Although one embodiment of the present invention has been described above, the present invention is not limited to the above-described embodiment.

For example, as viewed from the stacking direction of the plurality of bipolar electrodes 12, the collector 16 may have a shape such as a polygonal shape or a circular shape.

As viewed from the stacking direction of the plurality of bipolar electrodes 12, the welded portion 128 or the welded portion 129 may be arranged in at least a portion of the outer peripheral portion 161 of the collector 16.

The welded portion 128 may be arranged in a space between the resin members 28 adjacent to each other in the Z axis direction not on the end surface 28e of the resin member 28. Similarly, the welded portion 129 may be arranged in a space between the resin members 29 adjacent to each other in the Z axis direction not on the end surface 29e of the resin member 29.

REFERENCE SIGNS LIST

10: power storage device, 12: bipolar electrode, 14: separator, 16: collector, 16a: first surface, 16b: second surface, 18: positive electrode layer, 20: negative electrode layer, 28, 29: resin member (first resin member), 30, 31: insulating case (second resin member), 128, 129: welded portion, 161: outer peripheral portion.

The invention claimed is:

1. A power storage device comprising:
a plurality of bipolar electrodes being stacked, each of the plurality of bipolar electrodes including a collector having a first surface and a second surface opposite to the first surface, a positive electrode layer provided on the first surface, and a negative electrode layer provided on the second surface;
a first resin member provided on at least one surface of the first surface and the second surface in at least a portion of an outer peripheral portion of the collector;
a second resin member provided on the first resin member and supporting the outer peripheral portion of the collector via the first resin member; and
a first plate disposed at a first end of the plurality of bipolar electrodes in a stacking direction of the plurality of bipolar electrodes and a second plate disposed at a second end of the plurality of bipolar electrodes in the stacking direction, the first plate and the second plate interposing the plurality of bipolar electrodes therebetween and each plate having at least one through hole for a penetrating bolt extending in the stacking direction,
wherein the respective first resin members for the bipolar electrodes adjacent to each other in the stacking direction are connected to each other by a welded portion made of the same material as a material of the first resin member,
wherein the second resin member comprises a portion covering an outer side of the first resin member, the outer side extending in the stacking direction,
wherein the welded portion is provided on the outer side of the first resin member and extends continuously from a first bipolar electrode of the plurality of bipolar electrodes disposed at the first end to a second bipolar electrode of the plurality of bipolar electrodes disposed at the second end in the stacking direction of the plurality of bipolar electrodes,
wherein the first resin members overlap each other in the stacking direction of the plurality of bipolar electrodes, and the first resin members adjacent to each other are in contact with each other and welded to each other to form the welded portion,
wherein the welded portion is provided between an end surface of the first resin member and the second resin member,
wherein each of the at least one through hole is arranged at an outside of the second resin member as viewed from the stacking direction, and
wherein the end surface of the first resin member has a first region on which the welded portion is provided and a second region on which the welded portion is not provided.

2. The power storage device according to claim 1, wherein the welded portion is arranged on each side of the collector having a rectangular shape as viewed from the stacking direction of the plurality of bipolar electrodes.

3. The power storage device according to claim 1, wherein a member is located between the first resin members adjacent to each other.

4. The power storage device according to claim 1, wherein the welded portion is a rod shape.

5. The power storage device according to claim 1, wherein the second resin member further comprises a second portion disposed between the first plate and the plurality of bipolar electrodes and between the second plate and the plurality of bipolar electrodes.

6. The power storage device according to claim 1, further comprising:
a positive electrode disposed at the first end between the first plate and the plurality of bipolar electrodes and a negative electrode disposed at the second end between the plurality of bipolar electrodes and the second plate.

* * * * *